(12) United States Patent
Clarabut et al.

(10) Patent No.: US 12,519,151 B2
(45) Date of Patent: Jan. 6, 2026

(54) HIGH VOLTAGE JUNCTION BOX FOR A BATTERY PACK

(71) Applicant: Archer Aviation Inc., San Jose, CA (US)

(72) Inventors: Alex Clarabut, Santa Clara, CA (US); Michael Schwekutsch, Los Gatos, CA (US); Paul Frihauf, San Jose, CA (US); Alan D Tepe, Fremont, CA (US); Stephen Spiteri, Livermore, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 19/014,981

(22) Filed: Jan. 9, 2025

(65) Prior Publication Data

US 2025/0145274 A1 May 8, 2025

Related U.S. Application Data

(63) Continuation of application No. PCT/US2023/079638, filed on Nov. 14, 2023.
(Continued)

(51) Int. Cl.
*H01M 10/613* (2014.01)
*B60L 3/04* (2006.01)
(Continued)

(52) U.S. Cl.
CPC .......... *H01M 10/613* (2015.04); *B60L 3/04* (2013.01); *B60L 50/60* (2019.02); *B60L 58/26* (2019.02);
(Continued)

(58) Field of Classification Search
CPC .......... B64C 3/32; H01M 10/425; H01M 2010/4271; H01M 10/482; H01M 10/486;
(Continued)

(56) References Cited

U.S. PATENT DOCUMENTS

| | | | |
|---|---|---|---|
| 2008/0047767 A1* | 2/2008 | Tsuchiya | H01M 50/249 |
| | | | 180/68.5 |
| 2013/0084478 A1* | 4/2013 | Watanabe | H01M 50/204 |
| | | | 429/98 |

(Continued)

FOREIGN PATENT DOCUMENTS

| | | | |
|---|---|---|---|
| CN | 103035860 A | 4/2013 | |
| CN | 111186585 A | 5/2020 | |

(Continued)

OTHER PUBLICATIONS

International Search Report and Written Opinion for counterpart PCT application No. PCT/US2023/079638, dated Jan. 31, 2024, 32 pages.

(Continued)

*Primary Examiner* — Brady W Frazier
(74) *Attorney, Agent, or Firm* — Finnegan, Henderson, Farabow, Garrett & Dunner, LLP

(57) ABSTRACT

A battery pack assembly, comprising: a battery pack, the battery pack comprising: a battery pack enclosure, and one or more battery cells within the battery pack enclosure, and a junction box, the junction box comprising: a junction box enclosure including one base wall, four side walls connected to the base wall, and one open end, and a battery management unit, at least one fuse, and at least one switch, each located within the junction box enclosure and mounted to the base wall. The four side walls of the junction box enclosure are removably secured to the battery pack enclosure at the open end.

23 Claims, 11 Drawing Sheets

Related U.S. Application Data

(60) Provisional application No. 63/383,660, filed on Nov. 14, 2022.

(51) Int. Cl.

| | | |
|---|---|---|
| *B60L 50/60* | (2019.01) | |
| *B60L 58/26* | (2019.01) | |
| *B64C 3/32* | (2006.01) | |
| *B64D 27/357* | (2024.01) | |
| *B64D 33/08* | (2006.01) | |
| *H01M 10/42* | (2006.01) | |
| *H01M 10/48* | (2006.01) | |
| *H01M 10/625* | (2014.01) | |
| *H01M 10/6554* | (2014.01) | |
| *H01M 10/6556* | (2014.01) | |
| *H01M 10/6568* | (2014.01) | |
| *H01M 50/204* | (2021.01) | |
| *H01M 50/249* | (2021.01) | |
| *H01M 50/583* | (2021.01) | |
| *H02G 3/08* | (2006.01) | |
| *H02H 7/20* | (2006.01) | |
| *B64C 29/00* | (2006.01) | |

(52) U.S. Cl.
CPC .............. *B64C 3/32* (2013.01); *B64D 27/357* (2024.01); *B64D 33/08* (2013.01); *H01M 10/425* (2013.01); *H01M 10/482* (2013.01); *H01M 10/486* (2013.01); *H01M 10/625* (2015.04); *H01M 10/6554* (2015.04); *H01M 10/6556* (2015.04); *H01M 10/6568* (2015.04); *H01M 50/204* (2021.01); *H01M 50/249* (2021.01); *H01M 50/583* (2021.01); *H02H 7/20* (2013.01); *B60L 2200/10* (2013.01); *B64C 29/0008* (2013.01); *H01M 2010/4271* (2013.01); *H01M 2200/103* (2013.01); *H01M 2220/20* (2013.01); *H02G 3/08* (2013.01)

(58) Field of Classification Search
CPC .............. H01M 50/204; H01M 50/249; H01M 2220/20; B64D 27/357; H02G 3/08
USPC ...................................................... 244/129.1
See application file for complete search history.

(56) References Cited

U.S. PATENT DOCUMENTS

| | | | | |
|---|---|---|---|---|
| 2013/0273755 | A1* | 10/2013 | Yokoyama | H01M 10/425 439/76.2 |
| 2014/0295216 | A1* | 10/2014 | Matsuda | H01M 50/224 429/7 |
| 2016/0344073 | A1* | 11/2016 | Hayashi | H01M 50/204 |
| 2020/0282853 | A1 | 9/2020 | Paryani et al. | |
| 2021/0175555 | A1* | 6/2021 | Okiga | H01M 10/6567 |
| 2021/0296729 | A1* | 9/2021 | Kobayashi | H01M 50/262 |
| 2021/0391627 | A1* | 12/2021 | Villanueva | B64C 1/16 |
| 2022/0255159 | A1 | 8/2022 | Amante et al. | |
| 2023/0068924 | A1* | 3/2023 | Ito | B60R 16/0238 |

FOREIGN PATENT DOCUMENTS

| | | |
|---|---|---|
| CN | 113659262 A | 11/2021 |
| EP | 1369305 A2 | 12/2003 |
| JP | 2006080042 A | 3/2006 |
| JP | 2012253836 A | 12/2012 |
| JP | 2013076602 A | 4/2013 |
| JP | 2016025037 A | 2/2016 |
| JP | 2021193871 A | 12/2021 |
| KR | 20200103534 A | 9/2020 |
| WO | 2013188680 A1 | 12/2013 |
| WO | 2017221379 A1 | 12/2017 |
| WO | 2018105345 A1 | 6/2018 |
| WO | 2022145303 A1 | 7/2022 |

OTHER PUBLICATIONS

International Preliminary Report on Patentability for counterpart PCT application No. PCT/US2023/079638, dated Sep. 13, 2024, 14 pages.
Examination report for counterpart Australian Patent Application No. 2023382736, dated Jan. 20, 2025 (3 pages).

* cited by examiner

HIGH VOLTAGE JUNCTION BOX FOR A BATTERY PACK

CROSS-REFERENCE TO RELATED APPLICATIONS

This disclosure is a continuation of International Application No. PCT/US2023/079638, filed Nov. 14, 2023, titled "High Voltage Junction Box for a Battery Pack" which in turn claims priority to and the benefit of U.S. Provisional Application No. 63/383,660, filed Nov. 14, 2022, titled "Systems and Methods for Improved Battery Assemblies for eVTOL Aircraft". The entire contents of the aforementioned applications are incorporated by reference herein for all purposes.

TECHNICAL FIELD

This disclosure relates generally to the field of powered aerial vehicles. More particularly, and without limitation, the present disclosure relates to innovations in aircraft that use electrical propulsion systems. Certain aspects of the present disclosure generally relate to the high voltage power supply (HVPS) systems and battery assemblies used in the aerial vehicles.

SUMMARY

Embodiments of the present disclosure provide a battery pack assembly which includes a battery pack comprising a battery pack enclosure and one or more battery cells. The battery pack assembly further includes a junction box comprising a junction box enclosure including one base wall, four side walls, and one open end. A battery management unit, at least one fuse, and at least one switch may be mounted to the base wall. Further, the four side walls of the junction box enclosure are secured to the battery pack enclosure.

Further, embodiments of the present disclosure provide an aircraft wing which includes a battery pack comprising a battery pack enclosure and one or more battery cells. The aircraft wing further includes a junction box comprising a junction box enclosure including one base wall, four side walls, and one open end. A battery management unit, at least one fuse, and at least one switch may be mounted to the base wall. Further, the four side walls of the junction box enclosure are secured to the battery pack enclosure.

DETAILED DESCRIPTION

Figure 1A:
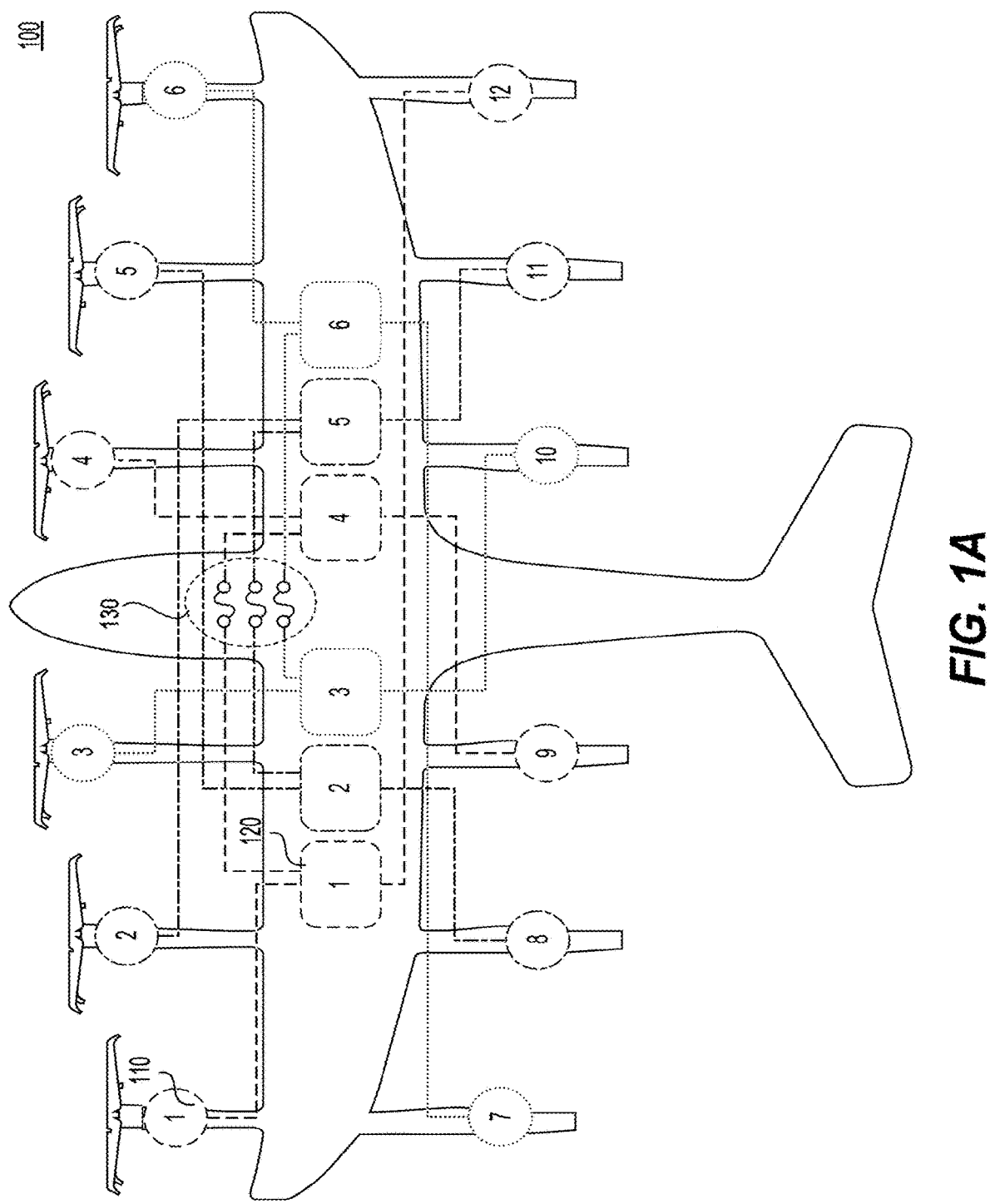
FIG. 1a illustrates an example eVTOL aircraft, consistent with embodiments of the present disclosure.

The present disclosure addresses components of electric vertical takeoff and landing (eVTOL) aircraft primarily for use in a non-conventional aircraft. For example, the eVTOL aircraft of the present disclosure may be intended for frequent (e.g., over 50 flights per workday), short-duration flights (e.g., less than 100 miles per flight) over, into, and out of densely populated regions. The aircraft may be intended to carry 4-6 passengers or commuters who have an expectation of a low-noise and low-vibration experience. Accordingly, it may be desired that their components are configured and designed to withstand frequent use without wearing, that they generate less heat and vibration, and that the aircraft include mechanisms to effectively control and manage heat or vibration generated by the components. Further, it may be intended that several of these aircraft operate near each other over a crowded metropolitan area. Accordingly, it may be desired that their components are configured and designed to generate low levels of noise interior and exterior to the aircraft, and to have a variety of safety and backup mechanisms. For example, it may be desired for safety reasons that the aircraft are propelled by a distributed propulsion system, avoiding the risk of a single point of failure, and that they are capable of conventional takeoff and landing on a runway. Moreover, it may be desired that the aircraft can safely vertically takeoff and land from and into relatively restricted spaces (e.g., vertiports, parking lots, or driveways) compared to traditional airport runways while transporting around 4-6 passengers or commuters with accompanying baggage. These use requirements may place design constraints on aircraft size, weight, operating efficiency (e.g., drag, energy use), which may impact the design and configuration of the aircraft components.

Disclosed embodiments provide new and improved configurations of aircraft components that are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of eVTOL aircraft components.

In some embodiments, the eVTOL aircraft of the present disclosure may be designed to be capable of both vertical and conventional takeoff and landing, with a distributed electrical propulsion system enabling vertical flight, forward flight, and transition. Thrust may be generated by supplying high voltage electrical power to the electric engines of the distributed electrical propulsion system, which each may convert the high voltage electrical power into mechanical shaft power to rotate a propeller. Embodiments disclosed herein may involve optimizing the energy density of the electrical propulsion system. Embodiments may include an electric engine connected to an onboard electrical power source, which may include a device capable of storing energy such as a battery or capacitor, or may include one or more systems for harnessing or generating electricity such as a fuel powered generator or solar panel array. Some disclosed embodiments provide for weight reduction and space reduction of components in the aircraft, thereby increasing aircraft efficiency and performance. Given focus on safety in passenger transportation, disclosed embodiments implement new and improved safety protocols and system redundancy in the case of a failure, to minimize any single points of failure in the aircraft propulsion system. Some disclosed embodiments also provide new and improved approaches to satisfying aviation and transportation laws and regulations.

Aircraft battery cell stacks may experience progressive degradation of battery characteristics and may become unusable in the aircraft over time. The typical parameters indicating this degradation are reduction in energy storage capacity below a threshold, increased temperature rise under conditions of higher stress (current, power) encountered in aircraft usage, increase in internal resistance/impedance of the battery, and reduction in power delivery capacity to a level below demands of a host device of the aircraft. However, the battery cell stack may continue to be useful in other secondary applications even after it is unusable in the aircraft. Meanwhile, a high voltage junction box associated with the battery cell stack may still be usable in the aircraft.

Embodiments of the present disclosure may provide for easy connection and disconnection between a battery cell stack and a high voltage junction box (HVJB) and between the battery cell stack and other components of the aircraft. Therefore, the battery cell stack may be easily removed and installed in a secondary application. Further, the battery cell stack may be designed in a manner that ensures it is compatible in the secondary application.

Aircraft battery junction boxes may also degrade and may become unusable in the aircraft over time. However, the junction boxes may still be useful in other secondary applications. Embodiments of the present disclosure may provide for easy connection and disconnection between a battery cell stack and a high voltage junction box (HVJB) and between the HVJB and other components of the aircraft. Therefore, the HVJB may be easily removed installed in a secondary application. Further, the HVJB may be designed in a manner that ensures it is compatible in the secondary application.

FIG. 1A illustrates an example eVTOL aircraft, consistent with embodiments of the present disclosure. As shown in FIG. 1a, in some embodiments, the distributed electrical propulsion system of the eVTOL aircraft 100 may include twelve electric engines 110, which may be mounted on booms forward and aft of the main wings of the aircraft 100. The forward electric engines 110 may be tiltable mid-flight between a horizontally oriented position (e.g., to generate forward thrust) and a vertically oriented position (e.g., to generate vertical lift). The forward electric engines 110 may be of a clockwise type or counterclockwise type in terms of direction of propeller rotation. The aft electric engines 110 may be fixed in a vertically oriented position (e.g., to generate vertical lift), and may also be of a clockwise type or counterclockwise type in terms of direction of propeller rotation.

The aircraft 100 may possess various combinations of forward and aft electric engines 110. For example, in some embodiments, the aircraft 100 may possess six forward electric engines 110 and six aft electric engines 110. In some other embodiments, the aircraft 100 may include four forward electric engines 110 and four aft electric engines 110, or any other combination of forward and aft engines 110. In some other embodiments, the number of forward electric engines and aft electric engines are not equivalent.

In some embodiments, for a vertical takeoff and landing (VTOL) mission, the forward electric engines 110 as well as aft electric engines 110 may provide vertical thrust during takeoff and landing. During flight phases where the aircraft 100 is in forward flight-mode, the forward electric engines 110 may provide horizontal thrust, while the propellers of the aft electric engines 110 may be stowed at a fixed position in order to minimize drag. The aft electric engines 110 may be actively stowed with position monitoring.

In some embodiments, in a conventional takeoff and landing (CTOL) mission, the forward electric engines 110 may provide horizontal thrust for wing-borne take-off, cruise, and landing. In some embodiments, the aft electric engines 110 may not be used for generating thrust during a CTOL mission and the aft propellers may be stowed in place.

Transition from vertical flight to forward flight and vice-versa may be accomplished via the tilt propeller subsystem. The tilt propeller subsystem may redirect thrust between a primarily vertical direction during vertical flight mode to a mostly horizontal direction during forward-flight mode. A variable pitch mechanism may change the forward electric engine's propeller-hub assembly blade collective angles for operation during the hover-phase, transition phase, and cruise-phase.

The tilt propeller system may include a linear or rotary actuator to change the orientation of a propulsion system during operation. In some embodiments, the pitch of the propulsion system may be changed as a function of the orientation of the propulsion system. In some embodiments, a rotary actuator may include a motor, inverter, and gearbox. In some embodiments, a gearbox may include various types of gears interfacing to provide a gear reduction capable of orienting the propulsion system. In some embodiments, a tilt propeller system may include a redundant configuration such that multiple motors, inverters, and gearboxes are present and interface using a gear. In some embodiments, a configuration utilizing multiple motors, gearboxes, and inverters may allow a failed portion of the redundant configuration to be driven by the motor, inverter, and gearbox of another portion of the configuration. In some embodiments, a gearbox configuration may also allow the tilt propeller system to maintain a propulsion system orientation with the help of, or without, additional power being provided by the system.

In some embodiments, an electric engine 110 may be housed or connected to a boom of the aircraft 100 and include a motor, inverter, and gearbox. In some embodiments, the motor, inverter, and gearbox may be interfaced such that they share a central axis. In some embodiments, the torque originating in the motor may be sent away from the propellers of the propulsion system and to a gearbox. In some embodiments, a gearbox may provide a gear reduction and then send the torque, via a main shaft, back through a bearing located inside the motor and to the propeller. In some embodiments, an inverter may be mounted on the rear of a gearbox such that a main shaft does not travel through the inverter when outputting torque to the propeller.

As shown in FIG. 1A, the aircraft 100 may be configured with a distributed electric propulsion system enabling vertical flight, forward flight, and transition. The forward 6 electric engines 110 (which are numbered 1-6 from left to right) are with variable pitch propellers tilt to achieve vertical takeoff and landing, transition flight and fully wing-borne flight. The aft 6 electric engines 110 (which are numbered 7-12 from left to right) are equipped with fixed pitch propellers that operate during vertical takeoff and landing and transition and are stowed in a minimum drag position for conventional flight. The flight controls are an integrated fly-by-wire system that features envelope protection and structural load limiting functions. The aircraft 100 will be equipped with advanced cockpit avionics, a flight management system, and the sensors necessary to support the intended operations and system functions.

In some embodiments, an electrical propulsion system (EPS) as described herein may generate thrust by supplying High Voltage (HV) electric power to the electric engine 110, which in turn converts HV power into mechanical shaft power which is used to rotate a propeller. As mentioned above, an aircraft 100 as described herein may possess multiple electric engines 110 which are boom-mounted forward and aft of the wing. The amount of thrust each electric engine 110 generates may be governed by a torque command from the Flight Control System (FCS) over a digital communication interface to each electric engine 110. Embodiments may include forward electric engines 110, and may be able to alter their orientation, or tilt. Additional embodiments include forward engines that may be a clockwise (CW) type or counterclockwise (CCW) type. The forward electric engine propulsion subsystem may consist of a multi-blade adjustable pitch propeller, as well as a variable pitch subsystem.

In some embodiments, the aircraft 100 includes a high voltage power supply (HVPS) system to supply the High Voltage (HV) electric power. The HVPS system is the source of power on the aircraft 100 and configured to distribute the stored electrical energy to other systems on the aircraft 100, including the electrical propulsion system (EPS) for converting electrical power into mechanical rotational shaft power to generate thrust. As shown in FIG. 1a, the HVPS system of the aircraft 100 may include six battery packs 120 (which are numbered 1-6 from left to right) installed within the battery bays in the wing of the aircraft 100. In some embodiments, six battery packs 120 may have the identical design, to simplify the design, manufacturing, and logistics. The battery packs 120 may power one or more electric engines 110.

In some embodiments, a single battery pack 120 may be electrically connected to, and power, multiple electric engines 110. For example, in some embodiments, a battery pack 120 may power an electric engine 110 on either side of a longitudinal axis. In some embodiments a battery pack 120 may power an electric engine 110 on either side of a horizontal axis. In some embodiments, as shown in FIG. 1a, a battery pack 120 may power two diagonally opposing electric engines 110. For example, battery pack 1 may power electric engines 1 and 12. Battery pack 2 may power electric engines 5 and 8. Battery pack 3 may power electric engines 3 and 10. Battery pack 4 may power electric engines 4 and 9. Battery pack 5 may power electric engines 2 and 11. Battery pack 6 may power electric engines 6 and 7. Therefore, upon a loss of a battery pack 120, the impact to roll or pitch moments can be reduced because the loss of lift is balanced. In some embodiments, battery packs 120 may power different arrangements of electric engines 110 to reduce roll, pitch, or yaw moments that may be caused by a loss of the battery pack 120. For example, in some embodiments, battery packs 120 may be connected to electric engines 110 in any manner that balances lift and/or thrust across the longitudinal and horizontal axis of the aircraft.

Further, the HVPS system includes a cross-link 130 possessing a fuse allowing for pairing of two or more battery packs 120. Through the cross-link, power for the electric engines 110 can be shared among the paired battery packs 120. Therefore, multiple battery packs 120 can simultaneously power multiple electric engines 110. This arrangement provides for redundancy and avoids a single point of failure because each paired battery 120 may act as a backup for the other(s). Upon failure of a battery pack 120, one or more connected battery packs 120 may continue powering the failed battery pack's connected electric engines 110.

In some embodiments, as shown in FIG. 1a, a pair of battery packs 120 may include two battery packs 120. In some embodiments, a pair of two battery backs 120 may power a total of four electric engines 110. For example, battery pack 1, providing power to electric engines 1 and 12, may be cross-linked to battery pack 4, providing power to electric engines 4 and 9. Battery pack 2, providing power to electric engines 5 and 8, may be cross linked to battery pack 5, providing power to electric engines 2 and 11. Battery pack 3, providing power to electric engines 3 and 10, may be cross linked to battery pack 6, providing power to electric engines 6 and 7.

In some embodiments, more than two battery packs 120 may be cross-linked together. For example, in some embodiments, three battery packs 120 may be cross-linked. Therefore, in some embodiments, three battery packs 120 may power six electric engines 110. In some embodiments, four battery packs 120 may be cross-linked. Therefore, in some embodiments, four battery packs 120 may power eight electric engines 110. In some embodiments, a different arrangement of battery packs 120 and cross links may be chosen to best balance aircraft power needs, system redundancy, and fault tolerance.

Figure 1B:
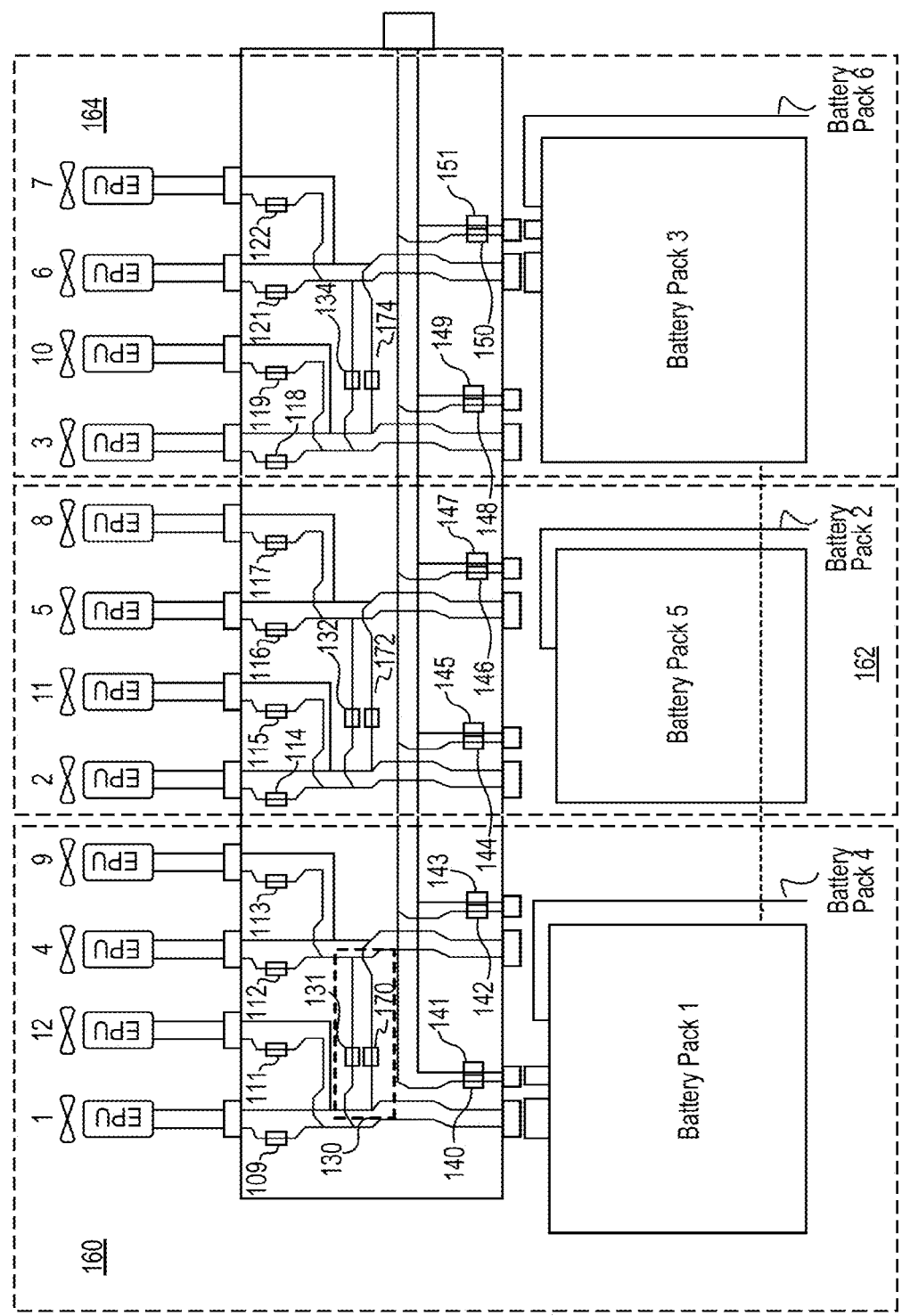
FIG. 1b illustrates a diagram of a high voltage power distribution system for an eVTOL aircraft, consistent with embodiments of the present disclosure.

FIG. 1b illustrates a diagram of a high voltage power system for an eVTOL aircraft, consistent with embodiments of the present disclosure. As shown in FIG. 1b, eVTOL aircraft may include a battery assembly comprising electrically separate battery pack units (e.g. 160, 162, and 164). Each battery pack unit may include battery packs 120 that are cross-linked together, as described above. In some embodiments, the battery pack units may include battery packs 120 that ensure aircraft controllability is maintained upon the loss of a battery pack unit. Therefore, upon a loss of a battery pack unit, the aircraft may still be controllable. In some embodiments, the battery pack units may include battery packs 120 that power electric engines 110 on opposite sides of one or more axis of symmetry. Therefore, upon a loss of a battery pack unit, the impact to roll, pitch, or yaw moments can be reduced because the loss of lift and/or thrust is balanced. In some embodiments, loss of power, or reduction of power, caused by failure of a battery pack unit will have a substantially symmetric effect (e.g., $<\pm5\%$, $<\pm10\%$, $<\pm15\%$, $<\pm20\%$, or $<\pm25\%$ asymmetry) with respect to roll, pitch, and/or yaw of the aircraft. Further, in some embodiments, the battery pack units may include battery packs 120 that reduce an overall amount of high voltage wiring between the batteries.

In some embodiments, as shown in FIG. 1b, the HVPS system may comprise three electrically separate battery pack units. For example, in some embodiments, battery pack unit 160 may include battery packs 1 and 4, powering electric engines 1, 4, 9, and 12. Battery pack unit 162 may include battery packs 2 and 5, powering electric engines 2, 5, 8, and 11. Battery pack unit 164 may include battery packs 3 and 6, powering electric engines 3, 6, 7, and 10. Therefore, each battery pack unit may include two paired battery packs 120 that simultaneously power four electric engines 110. Upon the failure of one battery pack 120 in a battery pack unit, the other paired battery pack 120 will continue powering the four electric engines.

In some embodiments, each battery pack units 160, 162, 164 may include a high voltage bus to cross-link battery packs 120 within the battery pack unit. In some embodiments, the cross-link 130 connects two high voltage channels, each feeding one or more electric engines 110. For example, in some embodiments, the cross link 130 may be connected to each battery pack's high voltage channel before the channel splits to power multiple electric engines 110 (e.g. to power two electric engines). A cross link may further include a bus connecting the negative voltage channels.

In some embodiments, each cross link 130 may include at least one fuse to disconnect the cross-link upon a failure of the cross-link. For example, fuses 131, 132, and 134 may be located on the cross-link connection of the positive high voltage channels in battery pack units 160, 162, and 164. In some embodiments, fuses 150, 152, and 174 may be located on the cross-link connection of the negative high voltage channels in battery pack units 160, 162, and 164. In some embodiments, the fuses may be pyro-technical fuses. As further detailed below, a battery management system of a connected battery pack 120 may determine a failure in a cross-link, such as a short circuit or overcurrent condition, and blow the one or more associated pyro-technical fuse(s). Therefore, the cross-link can be disconnected and further damage to HVPS system components (e.g. electric engines, batteries, EPUS) can be avoided. Further, the electric engines 110 will still receive power from the paired battery pack 120 in the battery pack unit. For example, upon a cross-link failure, pyro-technical fuse 131 and 150 may be blown, but electric engines 1 and 12 will still receive power from battery pack 1, and electric engines 4 and 9 will still receive power from battery pack 4.

In some embodiments, the HVPS system may include load disconnection devices to disconnect a portion of the HVPS circuit upon a failure (e.g. short circuit or overcurrent condition) of a downstream electric engine, a downstream EPU, or other downstream distribution circuitry. In some embodiments, a load disconnection device may be located directly upstream of the electric engine. For example, in some embodiments, load disconnection devices 109, 111, 112, and 113 may be located on the high voltage channel powering engines 1, 12, 4, and 9, respectively. Load disconnection devices 114, 115, 116, and 117 may be located on the high voltage channels powering engines 2, 11, 5, and 8, respectively. Load disconnection devices 118, 119, 121, and 122 may be located on the high voltage channels powering engines 3, 10, 6, and 7, respectively.

In some embodiments, the load disconnection devices are pyro-technical fuses. Upon failure of a downstream component, the pyro-technical fuse may receive a signal (e.g. from a battery management system of a connected battery) and blow the fuse. Therefore, the downstream components can be disconnected and further damage to other equipment (e.g. electric engines, batteries, EPUS) can be avoided. Further, the remaining electric engines 110 in the battery pack unit will still receive power from the connected battery packs 120. For example, upon a failure in a device or wiring downstream of pyrotechnical fuse 109, the pyrotechnical fuse 109 may be blown, but electric engines 12, 4, and 9 will still receive power from battery packs 1 and 4. Further, in some embodiments, the load disconnection device may include a contactor and the battery management system may command the contactor to disconnect the circuit. In some embodiments, both a contactor and a fuse may be used to provide for additional redundancy and the pyro-technical fuse may act as a backup for the contactor.

In some embodiments, the HVPS system may include a high voltage charging channel allowing all the battery packs 120 to be charged from the same charging port. The high voltage charging channel may include charging disconnection devices. In some embodiments, the charging disconnection devices may be positioned downstream of a common charging bus on the positive charging side. For example, disconnection devices 140, 142, 144, 146, 148, and 150 may provide for disconnection of battery packs 1, 4, 5, 2, 3, and 6, respectively. Similarly, in some embodiments, additional charging disconnection devices may be positioned on the negative charging side. For example, disconnection devices 141, 143, 145, 147, 149, and 151 may provide for disconnection of battery packs 1, 4, 5, 2, 3, and 6, respectively.

Figure 2A:
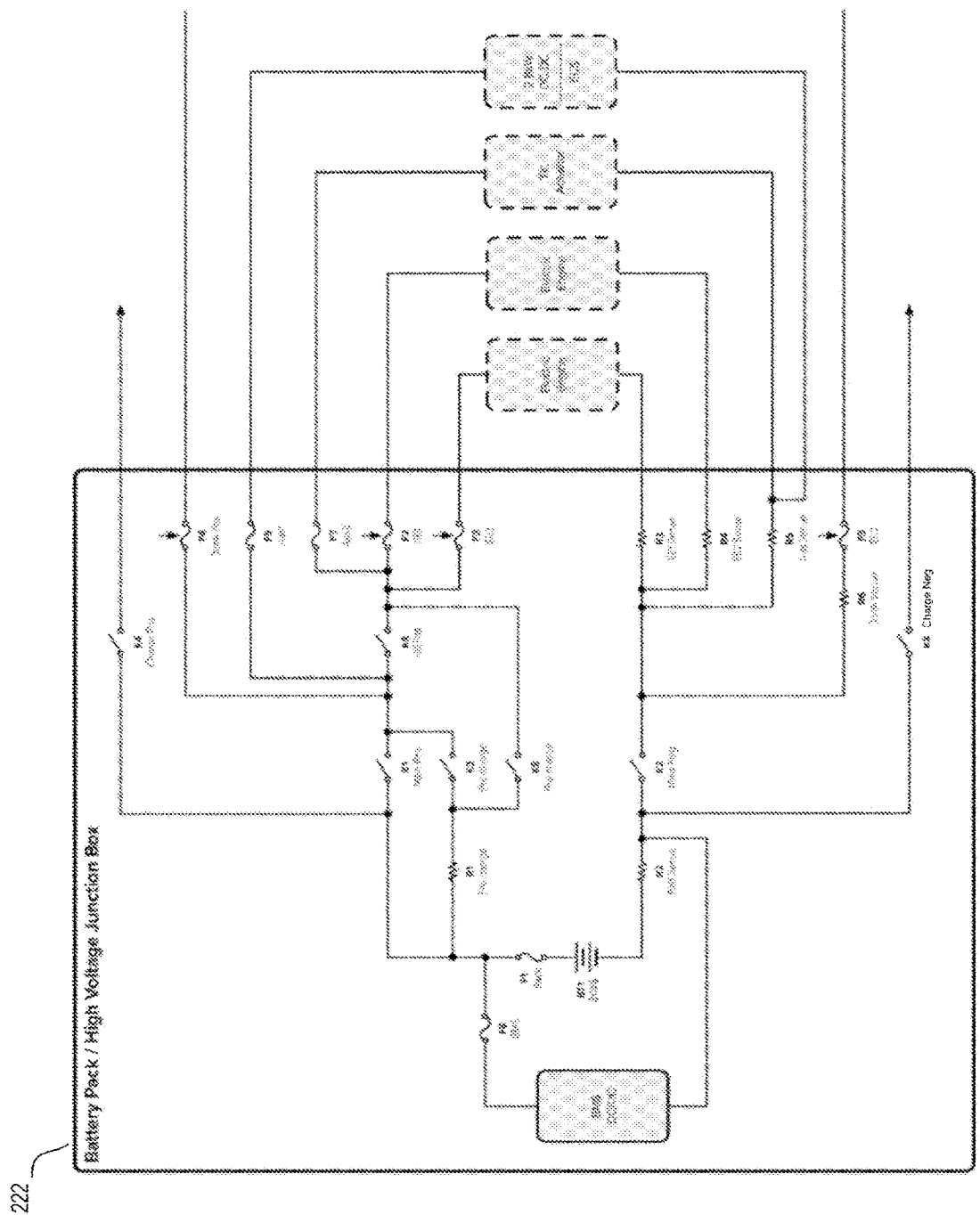
FIG. 2a illustrates a circuit diagram for a High Voltage Junction Box (HVJB), consistent with embodiments of the present disclosure.

In some embodiments, the charging disconnection devices are contactors, such as K4 pos and K4 neg in FIG. 2a. The charging contactors may act as a redundant measure to disconnect the battery packs 120 from charging. As further detailed below, a battery pack 120 may report a charging issue to a charge control unit (CCU). For example, a battery pack 120 may report a short circuit or overcurrent condition in the battery pack 120 or in the high voltage charging channel. In some embodiments, if the CCU fails to stop the charging, the battery packs 120 may command the charging contactors to disconnect the charging channel. In some embodiments, the battery packs 120 may automatically command the charging contactors to disconnect the charging channel without waiting for the CCU to fail. In some embodiments, after commanding the CCU to stop charging and/or disconnecting a battery pack 120 that detected the charging issues, the battery pack 120 and/or CCU may command the other battery packs 120 to disconnection from the charging channel. By disconnecting the battery packs 120 upon detecting a charging issue, damage to HVPS components can be avoided.

FIG. 2a illustrates a circuit diagram for a High Voltage Junction Box (HVJB), consistent with embodiments of the present disclosure. HVJB 222 may be electrically connected to the HV loads 210 to provide high voltage power. Specifically, the DC/DC converter in the battery management system (BMS) and the power storage element BT1 (e.g., the battery cells connected in parallel and in series) can be used to provide the high voltage power. The DC/DC converter and the power storage element BT1 are connected to each of the HV loads 210 through pre-charge resistor(s) (e.g., resistor R1) or current sensing resistor(s) (e.g., resistors R2-R6), switching devices K1-K5 (e.g., HV contactors), and a combination of active and passive fuses (e.g., F1-F7) to protect against various failure conditions (e.g., overcurrent, short-circuit etc.). In some embodiments, the fuses F1-F7 may be one or more of the fuses detailed above with respect to FIG. 1b. For example, in some embodiments, fuses F2 EE1, F3 EE2, and F4 Xlink may correspond to fuses 109, 111, and 131 detailed in FIG. 1b.

Fuse F1 may be a pack fuse to disconnect the failing battery pack 120 from the rest of the HVPS system. In some embodiments, F1 may be a pyro-technical fuse. Upon failure of a battery pack 120, the pyro-technical fuse F1 may receive a signal (e.g. from the associated battery management system) and blow the fuse F1. Therefore, further damage to other equipment (e.g. electric engines, EPUs, connected battery packs) can be avoided. Further, the electric engines 110 will still receive power from the paired battery packs 120 within the battery pack unit. For example, upon a battery pack failure, battery pack 1 pyro-technical fuse F1 may be blown, but electric engines 1, 12, 4, and 9 may still receive power from battery pack 4.

Figure 2B:
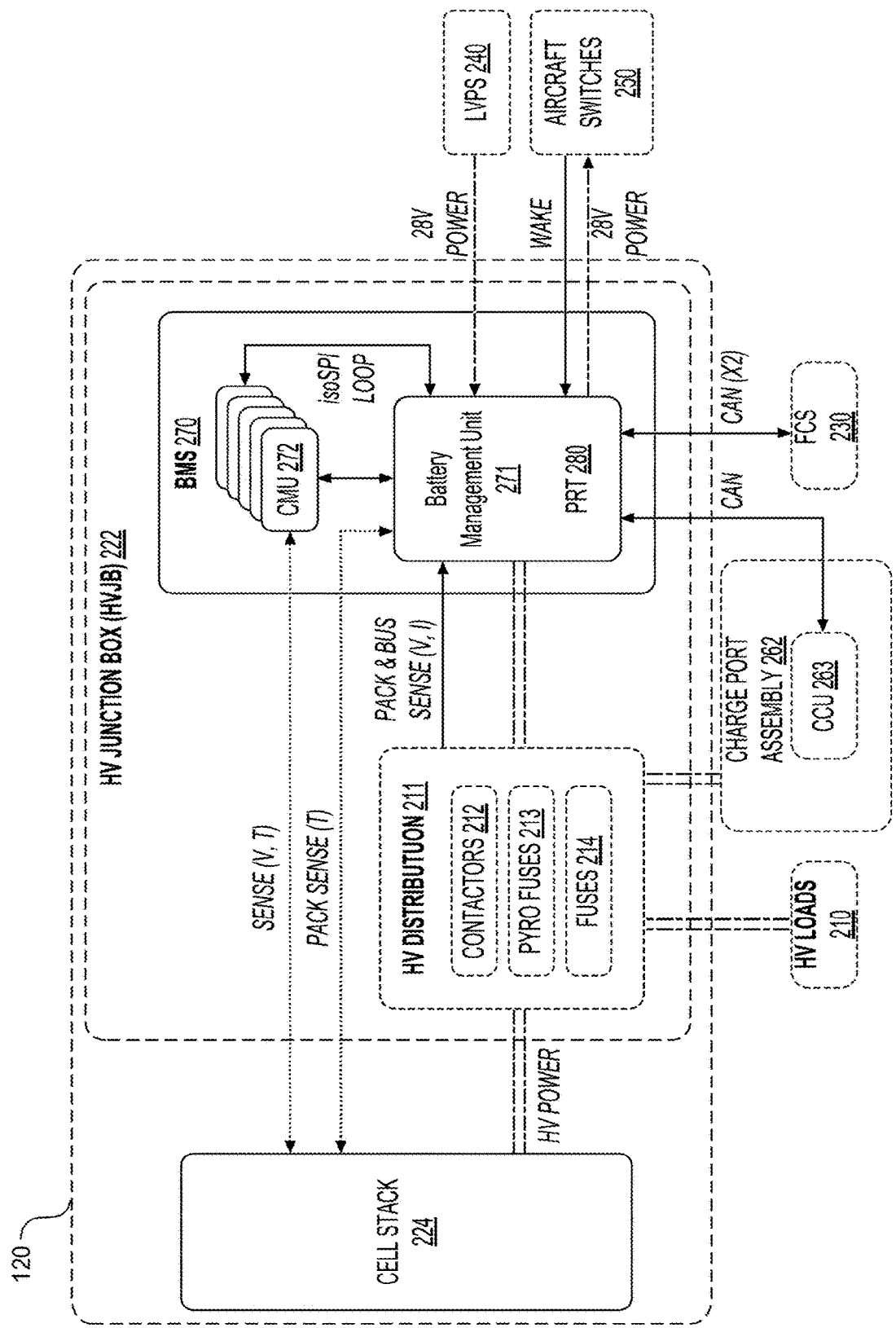
FIG. 2b illustrates a diagram of a High Voltage Junction Box (HVJB), consistent with embodiments of the present disclosure.

FIG. 2b illustrates a diagram of a High Voltage Junction Box 222 (HVJB), consistent with embodiments of the present disclosure. In some embodiments, each battery pack 120 contains an HV distribution unit 211 and a Battery Management System (BMS 270) housed within the HVJB 222. The battery management system 270 may include one or more processors, microprocessor, and/or controllers. The BMS 270 may be configured to monitor voltages, temperatures, currents, and isolation resistances. The BMS 270 may control battery pack contactors and pyrotechnical fuses to protect against fault conditions. As further detailed below, the BMS 270 may communicate with various systems within and outside the HVJB 222. The BMS 270 may include a Battery Management Unit (BMU 271) which may receive voltage, current, resistance, and temperature sensing signals from the cell stack assembly 224 and/or the HV distribution unit 211.

The BMS 270 may further include Cell Management Units (CMUs) 272 to monitor the voltages of each set of parallel cells connected in series in a cell block. The CMUs 272 may also monitor a cell block's temperature and current. In some embodiments, the CMUs 272 obtain measurements for all the cell groups in the battery pack 120 and communicate the measurements to the BMU 271 via isoSPI in a daisy-chain configuration. In some embodiments, the CMU 272 does not have an active management or control mechanism for cells within the cell block, but the CMU 272 is able to perform passive cell balancing of the series cell blocks when commanded by the BMU 271. The BMU system architecture may provide the flexibility to command passive balancing both on the ground and in the air.

The BMU 271 may monitor output current for each of the connected loads. The BMU 271 may be internally powered by the battery cell stack assembly 224 and continuously monitor the state of the battery even when it is not installed in the aircraft 100. By monitoring the battery pack 120, cell block, and cell group parameters, the BMU may protect against conditions that adversely affect safety or performance, such as overvoltage, undervoltage, overtemperature, under-temperature, loss of electrical isolation, short circuit, overcurrent, etc. The diagnostic function of the BMU 271 allows for fault detection and isolation through built-in-tests (BIT). In addition, the BMU 271 performs computation of the state of charge (SOC), state of health (SOH), failure condition (e.g. short circuit or overcurrent), state of power (SOP), state of energy (SOE) and state of temperature (SOT) of the battery pack 120. The BMU 271 also controls and monitors bus pre-charging, provides fuse and contactor commands, and communicates with various systems within and outside the HVJB 222. Further, the BMU 271 may communicate with aircraft switches 250 and the flight control system 230 and change operations based on received commands.

HV distribution unit 211 in the HVJB 222 may contain HV contactors 212 and a combination of active and passive fuses (e.g., pyrotechnical fuses 213 and fuses 214) to protect against overcurrent and short-circuit conditions. In some embodiments, the contactors 212 may correspond to one or more of switching devices K1-K5 (e.g. HV contactors) detailed in FIG. 2a. Similarly, the pyrotechnical fuses 213 and fuses 214, may correspond to one or more fuses F1-F7 detailed in FIG. 2a. HV Distribution Unit 211 may further include (or receive information from) current sensors (e.g. resistor R2-R6, hall effect sensors, shunt current sensors, or other sensors).

In some embodiments, BMU 271 may include a pyrotechnical fuse redundant trigger board (PRT 280). The BMU 271 may detect a failure event and send command signals to the PRT 280 for a corresponding pyro fuse driver to blow a fuse. For example, in some embodiments, HV Distribution Unit 211 may receive a sensor signal from a current sensor (e.g. resistor R3-R6) and provide information to the BMU 271 regarding the condition of the connected loads (e.g. a voltage, current, or temperature) at a point in the HVPS system. Based on the received information, the BMU 271 may determine a failure condition (e.g. because the value is outside a predetermined range) and send a command to PRT 280 to blow an associated pyrotechnical fuse. Therefore, the fault condition can be disconnected from the rest of the HVPS circuitry, protecting the remaining devices and wiring. In some embodiments the BMU 271 may directly monitor the sensors instead of receiving information through HV Distribution Unit 211.

In some embodiments, battery packs 120 may be in communication with each other, e.g. through BMS 270. The battery packs 120 may use information regarding the state of one or more paired battery packs 120 in a battery pack unit to help determine whether an overcurrent condition has occurred. For example, a battery pack 120 may determine an expected operation range (e.g. voltage, current etc.) based on the state of the battery pack and the communicated state of battery packs 120 within the battery pack unit. In some embodiments, HVJB 222 may further provide a redundant active trigger board configured to enable the pyro fuse driver to activate one or more pyrotechnical fuses when the BMS 270 fails to enable the pyro fuse driver. See U.S. Pat. No. 11,710,957 incorporated by reference.

The Control MCU (CCU 263) in the charge port assembly 262 may interface with the external battery charger and communicate with the BMUs 271 on the battery packs 120. This unit may be a hardware device, such as a computer, processor, or microprocessor. In some embodiments, the CCU 263 may be a single PCBA with one microcontroller that manages overall power delivery to each battery pack 120 when charging. As shown in FIG. 2, the CCU 263 may perform the handshake between the Ground Charging Subsystem 274 and the BMUs 271 and may command the BMUs 271 to open or close contactors 212, such as contactors K4 positive and K4 negative detailed in FIG. 2a. The CCU 263 may perform active detection and protection features for overvoltage protection. The BMUs 271 in each battery pack 120 may retain full control and continuously monitor their battery packs 120 during charging operations.

Figure 3A:
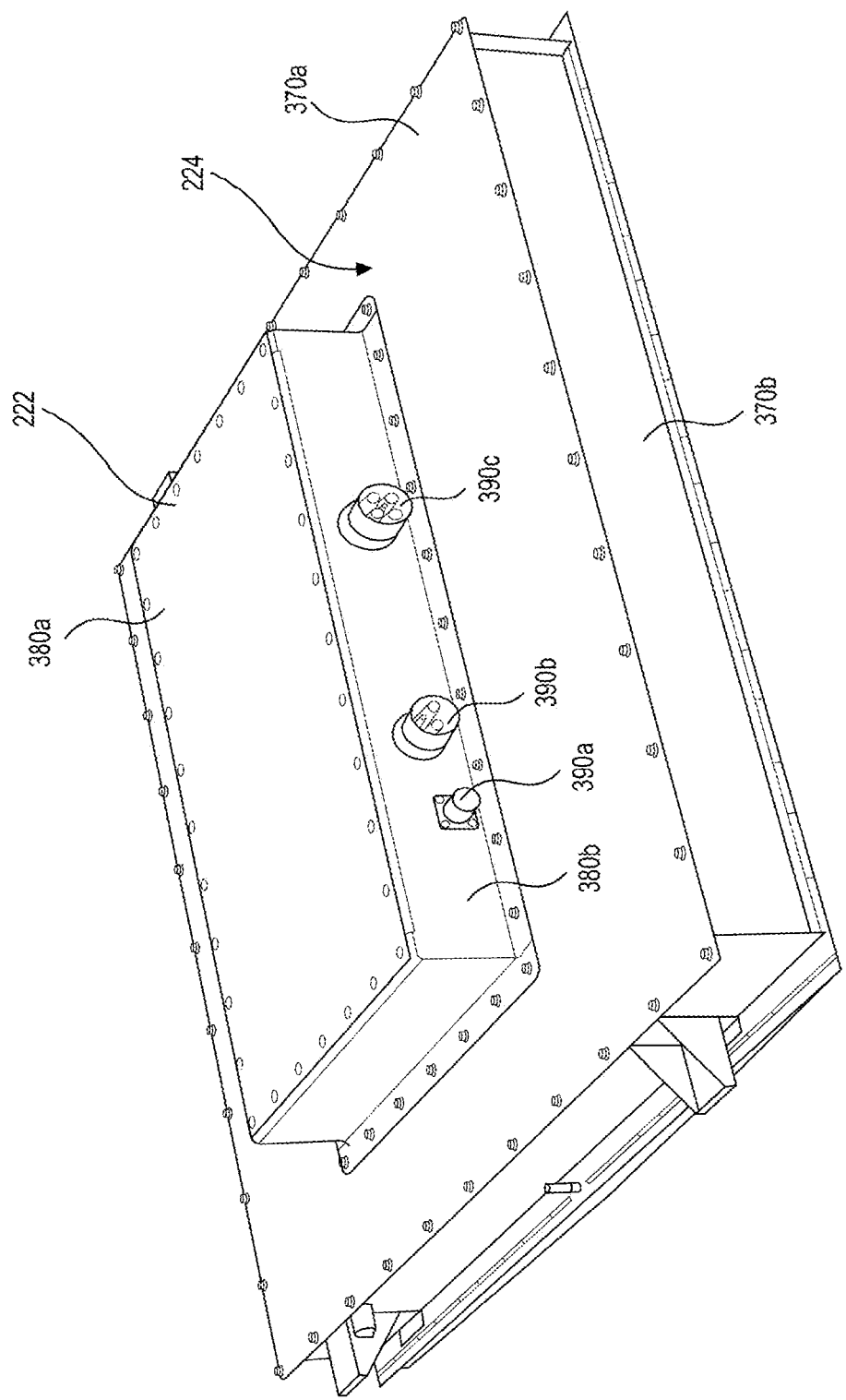
FIG. 3a illustrates the enclosure of a battery pack, consistent with embodiments of the present disclosure.

FIG. 3a illustrates the enclosure of the battery pack 120, consistent with embodiments of the present disclosure. As shown, the battery pack 120 includes the HVJB 222 and the cell stack assembly 224. The cell stack assembly 224 includes an enclosure 370 with base wall 370a and sidewalls 370b. Enclosure 370 may be made of plastic material, thermoplastic composite material, metal, or metal alloys. Similarly, HVJB 222 includes an enclosure 380 with a base wall 380a and four sidewalls 380b. Enclosure 380 may be made of plastic material, thermoplastic composite material, metal, or metal alloy. In some embodiments, the sidewalls 380b, may include a flange 380c on the opposite side from the base wall 380a. In some embodiments, the flange 380c may be continuous along the perimeter of the HVJB enclosure 380. In some embodiments, the base wall 380a, the sidewalls 380b and/or the flange 380c are formed of one continuous sheet of material. While in other embodiments, they are separate pieces of material that are fixed together.

As shown, the HVJB enclosure 380 is fixed to the cell stack assembly enclosure 370. In some embodiments, the flanged sidewalls 380c are screwed, bolted, anchored, or otherwise connected to the enclosure 370. Therefore, all the cell stack assembly 224 components and the HVJB 222 components are enclosed and protected. Connectors, such as 390a, 390b, and 390c may be fixed to a sidewall 380b of the HVJB enclosure 380. The connectors 390 may provide for high voltage and low voltage connection to the HVJB 222. The low voltage connectors may allow for communication between the BMS 270 and other aircraft components. As noted with reference to FIG. 2b, the low voltage connectors 390 may allow for communication between the BMS 270 and the Flight Control System 230, between the BMS 270 and the Aircraft Switches 250, and/or between the BMS 270 and the Charge Port Assembly 262. Further, in some embodiments when inverters (inv1, inv2) are in HVJB 222 and associated controllers are outside HVJB 222, low voltage connectors 390 allow the controllers to send commands to the inverters. Therefore, in some embodiments, one, two, three, four, or five low voltage connectors may be provided. However, any different number of low voltage connectors may be provided to meet the needs of the HVJB 222. Similarly, with reference to FIG. 2a-2b, the high voltage connectors may allow for high voltage power channels to power electric engines 110, cross link between battery packs, and tilt actuators. Further, one or more high voltage connectors 390 may allow for charging of the cell stack assembly 224. Therefore, in some embodiments, one, two, three, or more high voltage battery connectors may be provided to meet the needs of the battery pack 120.

Figure 3B:
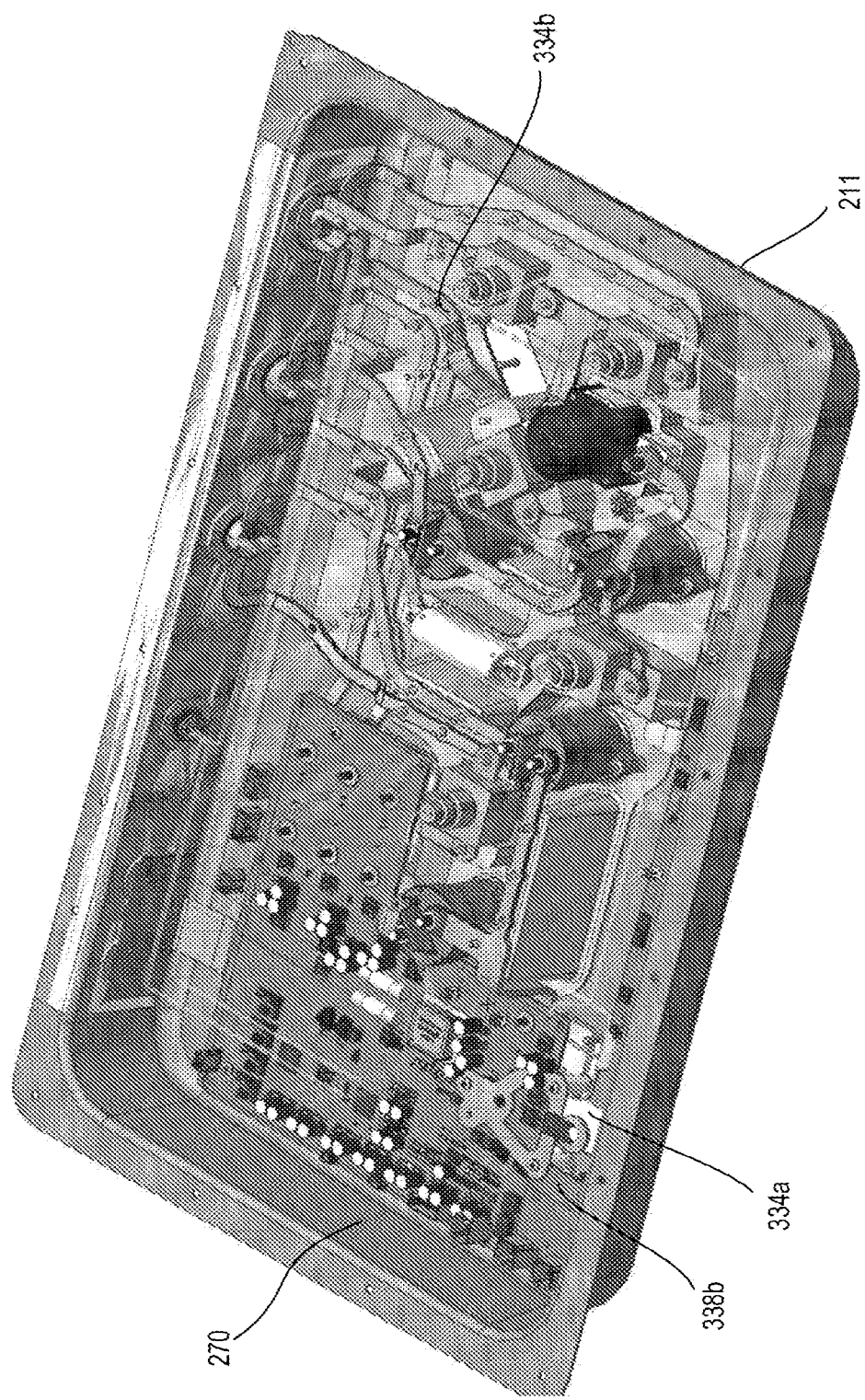
FIG. 3b illustrates High Voltage Junction Box (HVJB) components, consistent with embodiments of the present disclosure.

FIG. 3b illustrates HVJB 222 components, consistent with embodiments of the present disclosure. As shown, the components of the HVJB 222 are mounted on the base wall 380a. The base wall 380a includes the BMS 270 and associated components, such as the Battery Management Unit 271. Further, the base wall 380a includes the HV Distribution 211 components, such as contactors, pyrotechnical fuses, and/or other fuses. As detailed with reference to FIG. 2a, the base wall 380a may include any and all converters, capacitors, resistors, fuses, contactors, sensors, inverters, and inverter control components included in the HVJB 222. In some embodiments, all devices and circuitry for HVJB 222 may be mounted on base wall 380a.

Base wall 380a may include points of connection to provide for current transfer between the cell stack assembly 224, the HV Distribution 211 components, and the HV loads 210. In some embodiments, as further detailed below, negative bus bar 334a may allow for connection between the HVJB 222 and the negative side of the cell stack assembly 224. Positive bus bar 334b may allow for connection between the HVJB 222 and the positive side of the cell stack assembly 224. In other embodiments, electrical couplers, terminals, or other points of connection may be provided to make these connections.

Base wall 380a may include points of connection to provide for communication transfer between the cell stack assembly 224 and the BMS 270. In some embodiments, as further detailed below, the connection point(s) may allow for communication transfer between the BMU 271 and one or more Cell Management Units (CMUs) 272. In some embodiments, base wall 380a may include a single point of connection, 338b, for all the CMUs 272 to communication with the BMU 271. In some embodiments, this point of connection may be an electrical terminal, interface, and/or other type of connector. The BMU 271 may receive voltage, temperature, and current readings for the entire cell stack assembly 224 through this point of connection. In some embodiments, the communication transfer can be through an isoSPI communication cable routed from CMUs 272 to BMU 271. The IsoSPI communication cable may be mounted to the positive or negative bus bar to allow for easier manual connection of the cable and the point of connection may be an isoSPI interface.

The HV Distribution system 211 may include high voltage channels to power the HV loads 210. In some embodiments, the high voltage channels are bus bars mounted to the base wall 380a. While in other embodiments, the high voltage channels may include cables or other types of high voltage wiring. The high voltage channels may be bolted, screwed, or otherwise fastened to the base wall 380a. In some embodiments, the high voltage channels may be fastened at regular intervals. Similarly, the resistors, switching devices, fuses, and inverters may be bolted, screwed, soldered, adhered, or otherwise connected to the base wall 380a. The HV Distribution 211 may be secured to the base wall 380a in any manner that allows for removal of the cell stack assembly 224 from the HVJB 222 and connection of a new cell stack assembly 224 to the HVJB 222 without interfering with the HV Distribution 211.

Similarly, the BMS 270 and associated components may be secured to the base wall 380a. BMS 270 may include multiple microcontrollers, processors, and/or microprocessors to receive information, perform computations, and control high voltage contactors and fuses. These controllers and/or processors may be mounted to one or more circuit boards that are bolted, screwed, soldered, or otherwise connected to the base wall 380a. The BMS 270 may be secured to the base wall 380a in any manner that allows for removal of the cell stack assembly 224 from the HVJB 222 and connection of a new cell stack assembly 224 to the HVJB 222 without interfering with the BMS 270.

Figure 3C:
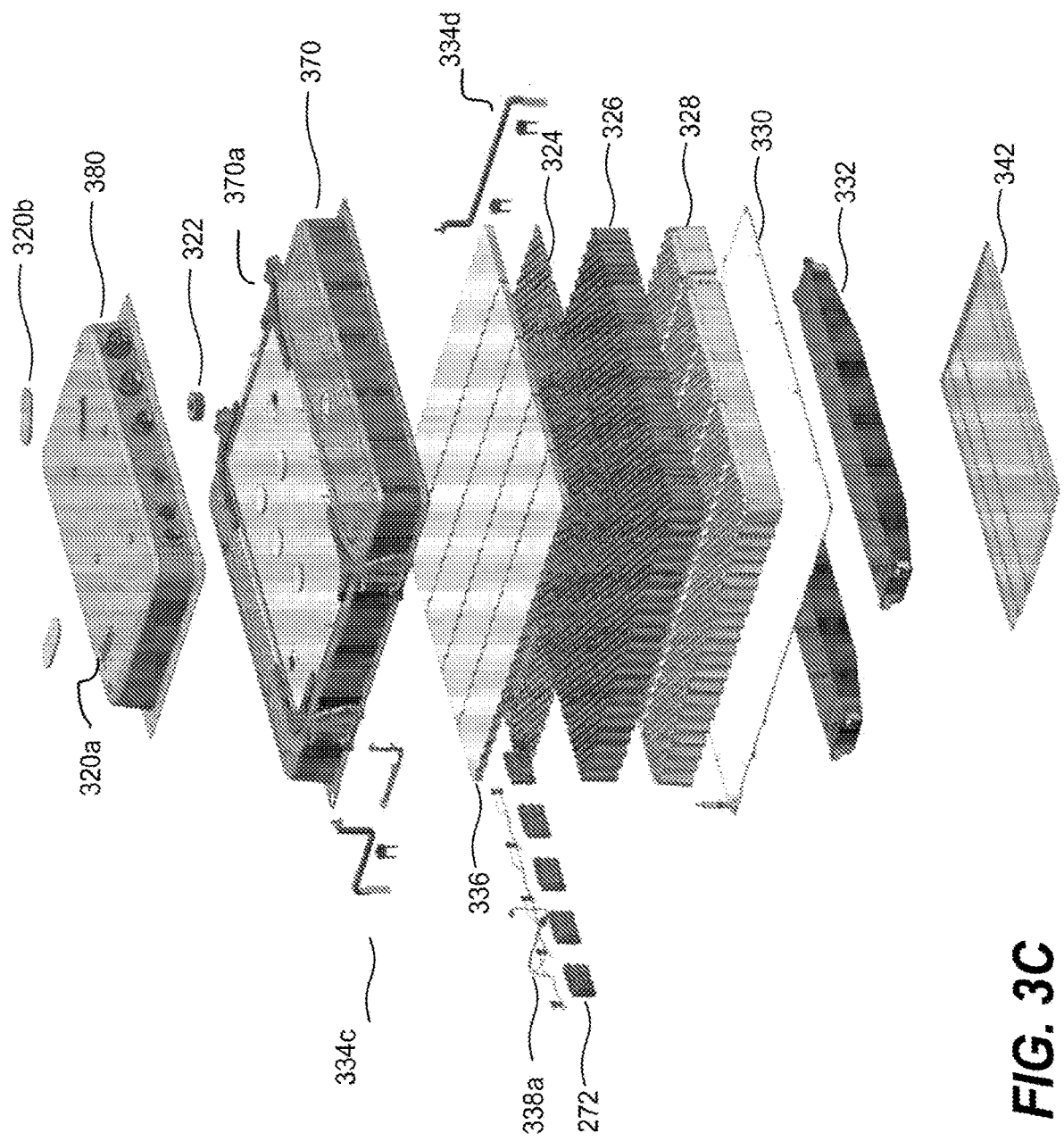
FIG. 3c illustrates an exploded view of a battery pack, consistent with embodiments of the present disclosure.

FIG. 3c illustrates an exploded view of a battery pack 120, consistent with embodiments of the present disclosure. As shown, HVJB enclosure 380 may include cut-outs 320a in base wall 380a to allow for manually connecting and disconnecting the high voltage and communication connection between the HVJB 222 and the cell stack assembly 224. In some embodiments, there may be three cutouts 320a. A first cutout 320a may provide for manual connection and disconnection of the HVJB negative busbar 334a to the cell stack assembly negative busbar 334c. A second cutout 320a may provide for manual connection and disconnection of the HVJB positive busbar 334b to the cell stack assembly positive busbar 334d. A third cutout 320a may provide for manual connection and disconnection of the communication cable 338a to the communication interface 338b. In some embodiments, there may be two cutouts 320a and the cutout for the negative bus bars (334a, 334c) may also serve as a cutout for the communication cable connection (338a, 338b). In some embodiments, there may be two cutouts and the connection between the positive bars (334b, 334d) may also serve as a cutout for the communication cable connection (338a, 338b). In some embodiments, all connections may share a single cutout 320a. The cutout(s) 320a may be sized to allow manual connection and disconnection. In some embodiments, the cutouts may be sized just large enough to allow for manual connection and disconnection, e.g. based on hand access trials. Therefore, the integrity of the HVJB enclosure 380 may be maintained.

The access panel covers 320b may cover the cutouts 320a. The access panel covers 320b may be bolted, screwed, or otherwise fastened to the HVJB enclosure 380. In some embodiments, the access panel cover 320*b* may be a recessed panel, a plug, a hinged door, a sliding insert, or any other device that covers the cutout 320*a*. In some embodiments, the access panel covers 320*b* may be made of the same material as HVJB enclosure 380, while in other embodiments different material(s) may be used.

Battery cell stack enclosure 370 may also have a cutout portion 370*a*. In some embodiments, the cutout portion 370*a* is approximately (e.g. within 5%, 10%, 15%, 20%) the same area as the open side of the HVJB enclosure 380. In some embodiments, the cutout portion 370*a* is the same size as the open side of the HVJB enclosure 380. Therefore, the HVJB 222 will be completely enclosed, but enclosure material can be reduced. In other embodiments, the cutout portion 370*a* may be smaller or may be composed of multiple cutout portions. The cutout portions 370*a* provide a means of manual connection of the negative bus bars (334*a*, 334*c*), the communication cables (338*a*, 338*b*), and the positive bus bars (334*b*, 334*d*). Preformed potting material 336 may provide a resistance to shock and vibration and help protect the battery pack cell assembly 224 from moisture, solvents, and corrosive agents. An additional barrier material (e.g. insulation) may be installed between the potting material 336 and the HVJB 222. The barrier material may have one or more cutouts for the negative bus bar 334*c*, the communication cable 338*a*, and the positive bus bar 334*d*.

Current collector assemblies 324 combine the power of the various battery pack cells into the positive bus bar 334*d* and negative bus bar 334*c*. In some embodiments, the current collector assembly 334 may be a flexible circuit current collector assembly with integrated sense components adhered and laser welded. In some embodiments, the sense components may be directly integrated into a flexible printed circuit board that is part of the current collector assembly 334, without the need for adhesion or welding. The current collector assembly 334 may include multiple columns of cells and components integrated onto one central cell holder. In some embodiments, the current collector assembly 334 may provide a single component integrating the current collectors and sense lines via lamination to implement a laminated busbar with an integrated sensing layer to sense the voltage and/or the temperature of the corresponding cell group or corresponding cell block. For example, in each column, voltage and temperature sensing lines may be arranged by lamination and configured to collect voltage traces at one end of the column.

In some embodiments, the current collector assembly 324 is bolted and welded to the battery pack bus bars used to connect the positive and negative ends of the cell stack assembly 224 to the HVJB 222. In some embodiments, the current collector assembly 324 is made by nickel-plated copper conductors attaching to individual battery cells to form the electrical path for a desired cell combination. For example, the current collector assembly 324 may have a 210S7P pack architecture, which contains a series of cell groups, each cell group containing parallel cells. The current collector assembly 324 may integrate both voltage and temperature sense lines for each cell block.

Battery pack cells 326 may comprise high power battery cells. In some embodiments, battery pack cells 326 are lithium-ion battery cells. In some embodiments, the battery pack cell assembly has 10 kwh-40 kwh for each battery pack and/or 60-240 kwh across all battery packs. Cells may be installed in cell holder 328 to secure them into place. Heat exchanger 330 may be affixed to cell holder 328. Heat exchanger 330 can be bonded using a thermally conductive adhesive (e.g., a flame-retardant acrylic adhesive). The thermally conductive adhesive can be used to conduct the heat generated by the cells to the heat exchanger 330. Heat exchanger 330 may enable regulation of the temperature within the battery pack 120 using a coolant fluid (e.g. Water Ethylene Glycol (WEG)) for heating and cooling. Heat exchanger 330 may include any number and orientation of channels to allow the coolant to flow through the heat exchanger 330. The heat exchanger 330 may be sized to support the required heating or cooling needs while operating within nominal pressure and flow rate conditions. In some embodiments the battery pack enclosure 370 may include couplers or other disconnection devices to provide for easy removal of battery packs 120 (or battery cell stack assembly 224) from coolant lines and for easy reinstallation of new battery packs 120 (or battery cell stack assembly 224). In some embodiments, the coolant lines may be secured to the frame of the aircraft to allow for easy removal and reinstallation of the battery packs 120 (or battery cell stack assemblies 224). In some embodiments, heat exchanger stiffeners 332 may be installed to help the heat exchanger 330 maintain its shape and connection to the battery cells 326.

Battery crush core 342 may be installed to protect the battery pack 120 in case of a crash. The crush core 342 may absorb the impact of a crash to maintain the integrity of the battery enclosure and components. In some embodiments, the crush core may be made out of aluminum honeycomb material and/or any other material that is able to absorb the impact. The crush core may be selected with sufficient stiffness to avoid the addition of other stiffening devices for the battery pack. In some embodiments, battery pack 120 may be installed with HVJB 222 towards the bottom of the aircraft wing and battery cell stack assembly 224 towards the top of the aircraft wing relative to the HVJB 222, such as when the aircraft is in a normal orientation. A normal orientation may include any aircraft orientation where the pitch and roll angles are within 90 degrees of the pitch and roll angles of the aircraft when it is grounded, for example an orientation of the aircraft as if the aircraft were to be grounded. In this orientation the crush core 342 may be installed on the HVJB enclosure 380. In some embodiments, battery pack 120 may be installed with battery cell stack assembly 224 towards the bottom of the aircraft wing and HVJB 222 towards the top of the aircraft wing relative to the battery cell stack assembly 224, when the aircraft is in a normal orientation. In this orientation the crush core 342 may be installed on the cell stack enclosure 370 and/or on heat exchanger stiffeners 332. In some embodiments, by installing the crush core 342 on the cell stack enclosure 370 and/or on heat exchanger stiffeners 332, a larger surface area will be provided to absorb the impact. The crush core may be sized so that it is substantially (e.g. within 2%, 5%, 10%) the same size as the face of the battery pack 120 closest to the bottom of an aircraft wing when the aircraft is in normal operation.

Figure 4:
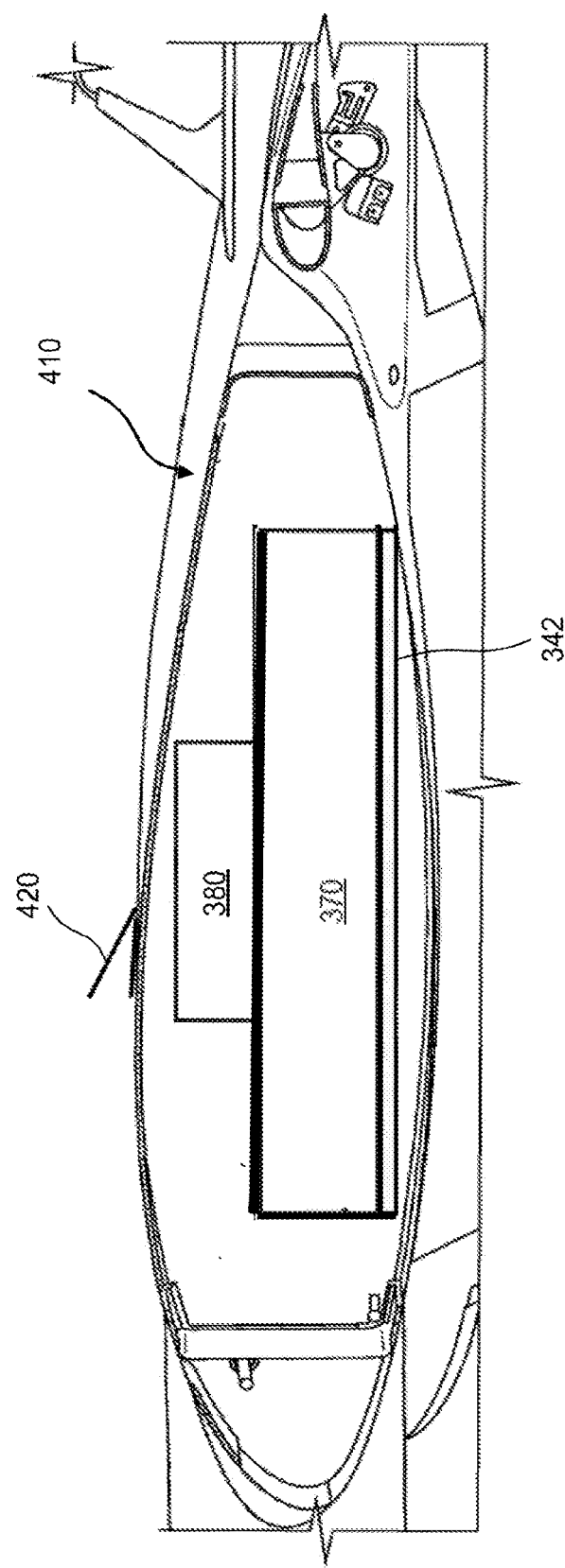
FIG. 4 illustrates a cross section view of a wing of an aircraft with a battery pack installed in the wing, consistent with embodiments of the present disclosure.

FIG. 4 illustrates a cross section view of a wing 410 of an aircraft with a battery pack 120 installed in the wing 410, consistent with embodiments of the present disclosure. The battery pack 120 may be secured to the aircraft wing 410 by brackets, channels, beams, or any other type of mounting system. In some embodiments, the mounting system may secure the battery packs 120 to ribs and/or spars inside the aircraft wing 410. In some embodiments, the battery packs 120 may be installed in the aircraft wing 410 so that both the junction box base wall 380*a* and the enclosure base wall 370a are substantially parallel (e.g. within 5-10 degrees) to the top and bottom face of the aircraft wings.

In some embodiments, the battery packs 120 may be installed towards the front or rear of the aircraft wing 410 to allow for access by aircraft maintenance staff. In some embodiments, the battery pack 120 may be positioned within the aircraft wing 410 to accommodate a desired center of gravity of the aircraft. For example, the battery packs 120 may be installed towards the rear of the aircraft wings 410 to move back the center of gravity and battery packs 120 may be installed towards the front of the aircraft wings to move forward the center of gravity. In some embodiments, a side of battery packs 120 may be substantially parallel (e.g. within 5-20 degrees) to the longitudinal axis of the aircraft. In some embodiments, a side of the battery packs 120 may be substantially parallel (e.g. within 5-20 degrees) to the leading edge of an aircraft wing 410 or a trailing edge an aircraft wing 410. In some embodiments, the battery packs 120 may be spaced evenly throughout the wing, while in other embodiments they may be spaced as needed to accommodate a desired center of gravity of an aircraft wing 410. In some embodiments, one or more battery packs 120 may be in a fuselage of the aircraft.

In some embodiments, the aircraft wing 410 may include an access panel 420 that allows for manual electrical connection and disconnection between the HVJB 222 and the battery cell stack assembly 224. For example, the access panel 420 may allow for connection and disconnection of high voltage bus bars and communication cables running between the HVJB 222 and the cell stack 224 as described above, with reference to FIGS. 3b-3c. In some embodiments, the cutouts and associated access panel 420 may be sized just large enough to allow for the manual connection and disconnection, e.g. based on hand access trials. For example, in some embodiments an access panel 420 may be between 2.5 inches by 2.5 inches to 5 inches by 5 inches (about 0.0635 meters by 0.0635 meters to about 0.1270 meters by 0.1270 meters), or any range in between. In some embodiments, the access panel may be 5-20% the top surface area of the wing. In other embodiments, the access panel 420 may be larger to allow for other service and maintenance of the battery pack 120 and/or removal of various components. For example, the access panel may be slightly (by 5 inches-12 inches or by about 0.1270 meters-0.3048 meters) wider than the junction box and/or battery pack cell stack. Each battery pack 120 within the aircraft wing 410 may be associated with one or more access panels 420. In some embodiments, for each battery pack 120, the number of access panels 420 matches the number of cutouts 320a in the HVJB enclosure 380.

In some embodiments, the access panel 420 may be a recessed panel, a plug, a hinged door, a sliding insert, or any other device that covers the cutout. In some embodiments, the access panel may be a recessed access panel installed flush with the skin of the aircraft. In some embodiments, the access panel may be covered with the same material as the aircraft skin or may have another aerodynamic material covering to minimize drag loss of the aircraft wing 410.

Figure 5:
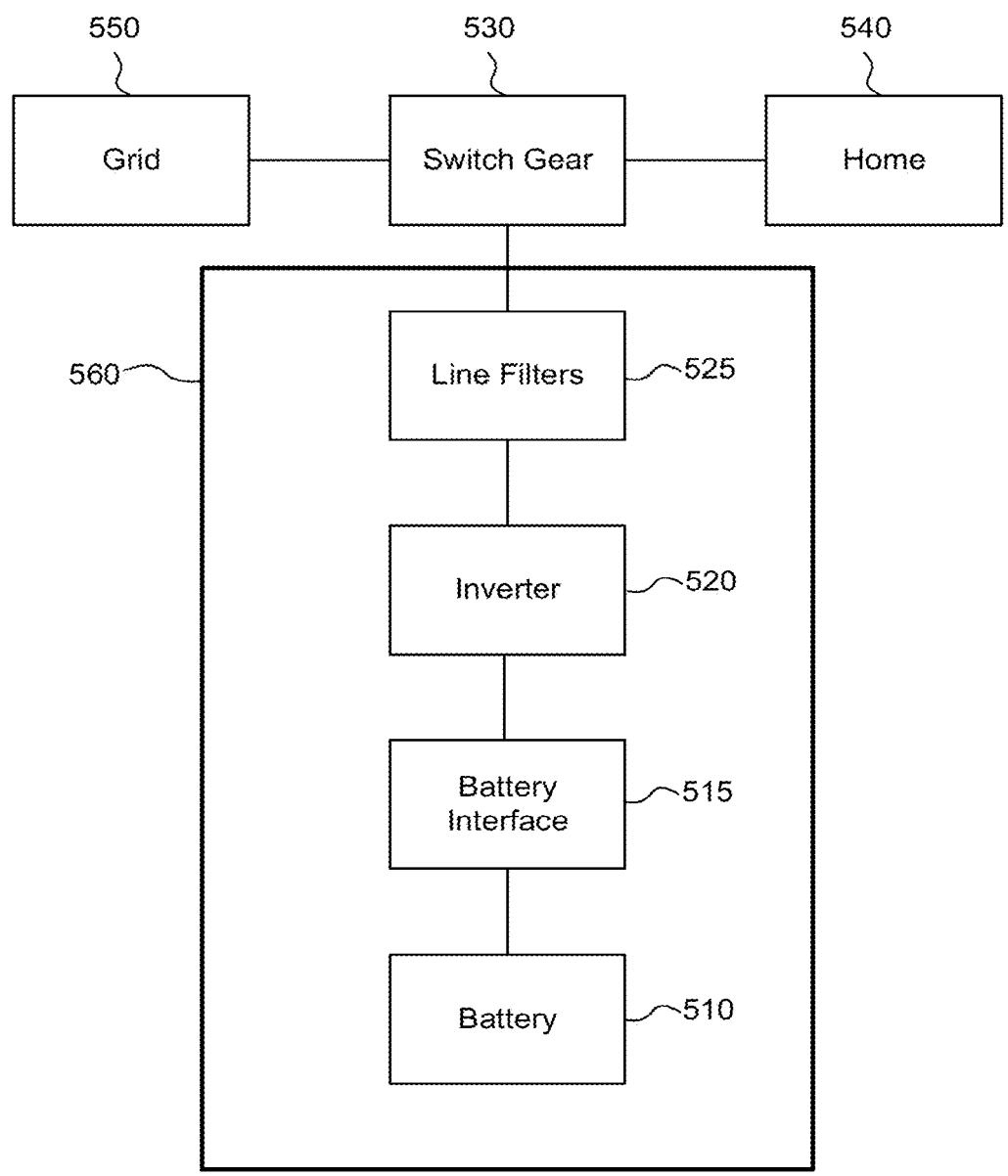
FIG. 5 illustrates a home system, consistent with embodiments of the present disclosure.
Figure 6:
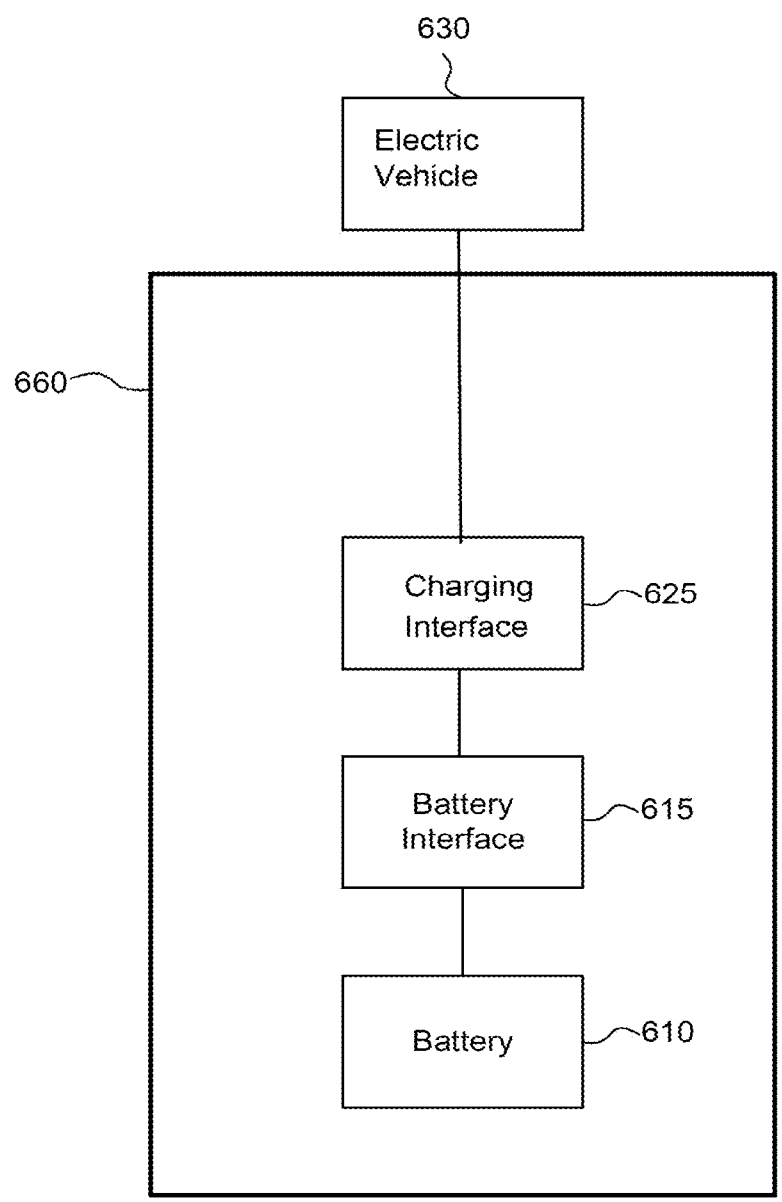
FIG. 6 illustrates a home charging system, consistent with embodiments of the present disclosure.
Figure 7:
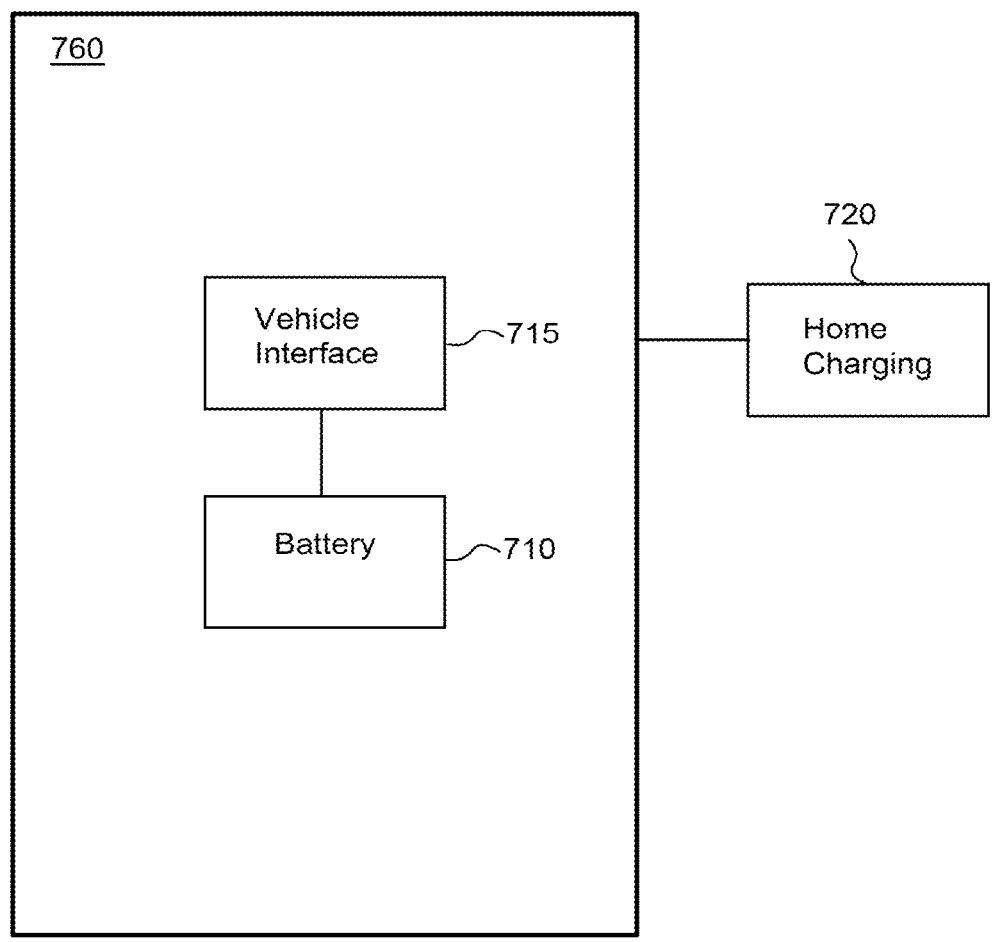
FIG. 7 illustrates an electric vehicle, consistent with embodiments of the present disclosure.

FIGS. 5-7 illustrate secondary systems that may incorporate the battery pack 120 and/or battery cell stack assembly 224. As described above, battery packs 120 experience progressive degradation of battery characteristics and become unusable in the aircraft over time. The typical parameters indicating this degradation are reduction in energy storage capacity below a threshold, increased temperature rise under conditions of higher stress (current, power) encountered in aircraft usage, increase in internal resistance/impedance of the battery or battery system, and reduction in power delivery capacity to a level below demands of a host device of the aircraft. However, the battery pack 120 and/or battery cell stack assembly 224 may continue to be useful in other secondary applications including but not limited to domestic power supply systems, rural energy storage systems, vehicle systems, and backup power systems including large scale power grid and domestic power grid backup systems.

In some embodiments, battery pack cell stack assembly 224 used originally in an aircraft may be repurposed for secondary use with high reliability. In some embodiments, the high voltage battery cell stack assembly 224 may have been originally designed for easy removal. As described above, the cell stack assembly 224 may have been designed for easy electrical disconnection between the cell stack assembly 224 and the HVJB 222. In some embodiments, a battery cell stack assembly 224 may only require positive and negative bus connections and a single communication connection to be used in a secondary application. Also, as described above, the cell stack assembly 224 may be designed for easy disconnection of coolant lines (e.g. glycol lines) running to and from the cell stack 224.

Further, in some embodiments, battery cell stack assembly 224 may have been originally designed for the primary and secondary use. Battery cell stack assembly 224 coolant system (e.g. heat exchanger 330) may be sized and configured to act as a heat sink for an inverter or other electronic components in a secondary application. Therefore, when a battery pack cell stack assembly 224 is used in a secondary application, no additional coolant will be required for the connected inverters or other electronic components. In some embodiments, battery cell stack assembly 224 may comprise a majority or all of the sensors required for proper functioning in secondary applications. Further, CMUs 272 may be configured to report sensor measurements (e.g. voltage, current, temperature) in a manner that is compatible for secondary applications.

In some embodiments, HVJB 222 may also be repurposed for secondary use with high reliability. In some embodiments, the HVJB 222 may have been originally designed for the primary and secondary use. In some embodiments, the HVJB 222 may be designed with an inverter (e.g. inv1, inv2) that is compatible with both the original use and the secondary use. For example, the inverter's voltage, current, power, temperature, humidity, and other ratings may be configured such that the inverter may be suitable for both the original use and the secondary use. In some embodiments a controller associated with the inverter may be included in the HVJB 222. The controller may be designed for primary and secondary use. For example, the controller may control the inverters (inv 1, inv 2) to provide a different electrical voltage or frequency required for secondary applications.

Further, in some embodiments, HVJB 222 may include logic in the BMS 270 that allows it to interface with various components in a secondary application. In some embodiments, BMS 270 may store various modes of operation and parameters for a secondary operation. For example, BMS 270 may include different thresholds for detecting failure conditions (overcurrent, short circuit etc.) in a secondary application based on requirements in that application. In some embodiments, the BMS 270 is configured to allow for updates to its logic. Further, the BMS 270 may be configured to report information in a manner that is usable in a secondary application. In some embodiments, the BMS 270 may report state of charge (SOC), state of health (SOH), failure condition (e.g. short circuit or overcurrent), state of power (SOP), state of energy (SOE), and state of temperature (SOT) in a format that is usable in a secondary application. For example, instead of a binary result (e.g. failed or not failed, overheated or not overheated), the BMS 270 may provide details of the measured conditions so that different decisions may be made in secondary applications (e.g. amount excess current, cell stack temperature etc.).

In some embodiments, a custom DC/DC battery interface may be required for the battery pack 120 or battery cell stack assembly 224 to be utilized in a secondary application. The HVJB 222 and/or battery pack cell stack assembly 224 may be configured to allow for connection to a DC/DC battery interface. For example, additional points of connection on pack bus bars may be provided or the pack bus bars may be positioned in a manner that is convenient for reinstallation.

FIG. 5 illustrates a home system 500, consistent with embodiments of the present disclosure. In some embodiments, a secondary use may be for installation within and providing power for a home system (i.e., a home electrical power system). In some embodiments, a home system may be a utility system which powers various subsystems of a residential home, a group of residential homes, a commercial place of business, or an industrial premise. In some embodiments, a home system may comprise an electronic switching system (ESS). In some embodiments, the battery 510, battery interface 515, inverter 520, and one or more line filters 525 may comprise an electronic switching system of the home system. In some embodiments, the battery interface 515 may be a DC/DC interface. In some embodiments, the switching network 530 may be configured to allow for powering of the home electrical lines 540 either via the electronic switching system 560 or via an external electrical power grid 550. In some embodiments, an entire battery pack 120, including HVJB 222, may be used in a home system. In some embodiments, multiple battery packs 120 may be connected together in parallel, series, or a combination arrangement to meet the needs of the home system in the secondary application. For example, battery packs 120 may be connected together through connectors 390a, 390b, and 390c.

FIG. 6 illustrates a home charging system, consistent with embodiments of the present disclosure. In some embodiments, the repurposed battery cell stack assembly 224 or battery pack 120 may allow for increased power applications. In some embodiments, battery cell stack assembly 224 or battery pack 120 may be utilized for DC fast charging (DCFC) applications in a home. In some embodiments, a DCFC application may comprise DCFC of an electric vehicle (EV) at significantly higher rates than currently possible. For example, two high power battery packs 120 comprising high power cells, as described herein, may be used in a home system to charge an EV in about 40-80% of the time typically required by a V3 Supercharger, and about 25 times faster than extant home EV charging stations. In some embodiments, multiple battery packs 120 may be connected together in parallel, series, or a combination arrangement to meet the needs of the secondary purpose. For example, battery packs 120 may be connected together in secondary applications through connectors 390a, 390b, and 390c.

In some embodiments, a battery 610 (e.g. battery cell stack assembly 224 or battery pack 120) may be installed in a home charging system 600 and may connect to a battery interface 615 including a DC/DC converter to convert the power as necessary for the charging application. Further, the battery interface 615 and/or battery 610 may connect to a charging interface 625. Charging interface 625 may include a power control unit to regulate the voltage and current supplied to the electric vehicle 630 based on communication with a BMS on the electric vehicle 630. Further, the charging interface 625 may include a receptor and various safety interlocks to ensure safe charging.

FIG. 7 illustrates an electric vehicle 760, consistent with embodiments of the present disclosure. In some embodiments, battery pack 120 and/or battery cell stack assembly 224 may be directly incorporated into a different vehicle in a secondary application. For example, the battery pack 120 and/or battery cell stack 224 may be included in an electric car, electric construction vehicle, drone, or any other electric vehicle. In some embodiments, battery 710 may be a battery cell stack assembly 224 incorporated into an electric vehicle 760. Vehicle interface 715 may include DC/DC converters, inverters, and other electronics required to power electric motors of the electric vehicle 760. In other embodiments, battery 710 may be an entire battery pack 120 including HVJB 222. Battery pack 120 may include inverters (e.g. inv1, inv2) that may directly provide power to electric motors of the electric vehicle 760. The vehicle interface 715 may monitor the battery 710 and control the inverters and/or associated controllers to meet the power requirements of the vehicle 760. Further, in some embodiments, vehicle interface 715 may include an onboard charger or other charging interface that allows charging system 720 to charge battery cell stack assembly 224.

The foregoing description has been presented for purposes of illustration. It is not exhaustive and does not limit the disclosure to the precise forms or embodiments disclosed. Modifications and adaptations of the disclosure will be apparent to those skilled in the art from consideration of the specification and practice of the disclosed embodiments of the disclosures disclosed herein.

The embodiments may further be described using the following clauses:

1. A battery pack assembly, comprising: a battery pack, the battery pack comprising: a battery pack enclosure; and one or more battery cells; and a junction box, the junction box comprising: a junction box enclosure including one base wall, four side walls, and one open end; and a battery management unit, at least one fuse, and at least one switch mounted to the base wall; wherein the four side walls of the junction box enclosure are secured to the battery pack enclosure.
2. The battery pack assembly of clause 1, wherein the battery pack enclosure includes a cut-out portion that is covered by the junction box upon securing the junction box enclosure to the battery pack enclosure.
3. The battery pack assembly of clause 1 or 2, wherein each side wall of the junction box enclosure has a flanged end that is secured to the battery pack enclosure.
4. The battery pack assembly of any of clauses 1-3, wherein the at least one switch is a contactor or relay.
5. The battery pack assembly of any of clauses 1-4, wherein the battery pack includes at least one cell management unit to monitor voltage and temperature of the one or more battery cells of the battery pack.
6. The battery pack assembly of clause 5, wherein the battery pack includes at least two cell management units that are daisy chained together.
7. The battery pack assembly of clause 6,
    wherein the battery pack assembly comprises a wired connection between the battery management unit and a cell management unit of the at least two cell management units; and wherein the battery management unit is configured to receive the voltage and temperature measurements of each cell management unit through the wired connection.
8. The battery pack assembly of any of clauses 1-7, wherein the junction box base wall includes at least one access panel configured to provide access to electrically connect the junction box and the battery pack.
9. The battery pack assembly of any of clauses 1-8, wherein the battery pack assembly is mounted inside an aircraft wing; and
wherein the aircraft wing includes at least one access panel configured to provide access to electrically connect the junction box to the battery pack.
10. The battery pack assembly of clause 9, wherein the battery pack is towards the bottom of the aircraft wing and the junction box is towards the top of the aircraft wing relative to the battery pack.
11. The battery pack assembly of any of clauses 1-10, wherein the battery pack assembly is mounted inside a fuselage of the aircraft.
12. An aircraft wing, comprising:
a battery pack, the battery pack comprising:
a battery pack enclosure; and
one or more battery cells;
a junction box, the junction box comprising:
a junction box enclosure including one base wall, four side walls, and one open end; and
a battery management unit, at least one fuse, and at least one switch mounted to the base wall;
wherein the four side walls of the junction box enclosure are secured to the battery pack enclosure.
13. The aircraft wing of clause 12, wherein the battery pack enclosure includes a cut-out portion that is covered by the junction box upon securing the junction box enclosure to the battery pack enclosure.
14. The aircraft wing of clause 12 or 13, wherein each side wall of the junction box enclosure has a flanged end that is secured to the battery pack enclosure.
15. The aircraft wing of any of clauses 12-14, wherein the at least one switch is a contactor or relay.
16. The aircraft wing of any of clauses 12-15, wherein the battery pack includes at least one cell management unit to monitor voltage and temperature of the one or more battery cells of the battery pack.
17. The aircraft wing of any of clauses 12-16, wherein the battery pack includes at least two cell management units that are daisy chained together.
18. The aircraft wing of clause 17,
wherein the aircraft wing comprises a wired connection between the battery management unit and a cell management unit of the at least two cell management units; and
wherein the battery management unit is configured to receive the voltage and temperature measurements of each cell management unit through the wired connection.
19. The aircraft wing of any of clauses 12-18, wherein the junction box base wall includes at least one access panel configured to provide access to electrically connect the junction box and the battery pack.
20. The aircraft wing of any of clauses 12-19, wherein the battery pack is towards the bottom of the aircraft wing and the junction box is towards the top of the aircraft wing relative to the battery pack.

21. The aircraft wing of clause 20, wherein the aircraft wing includes at least one access panel configured to provide access to electrically connect the junction box to the battery pack.

The invention claimed is:
1. A battery pack assembly, comprising:
a battery pack, the battery pack comprising:
a battery pack enclosure; and
one or more battery cells within the battery pack enclosure; and
a junction box, the junction box comprising:
a junction box enclosure including one base wall, a side wall structure connected to the base wall, and one open end; and
a battery management unit, at least one fuse, and at least one switch, each located within the junction box enclosure and mounted to the base wall;
wherein the side wall structure of the junction box enclosure is configured to be removably secured to the battery pack enclosure at the open end, such that the base wall is not within the battery pack enclosure.
2. The battery pack assembly of claim 1, wherein the battery pack enclosure includes a cut-out portion that is covered by the junction box upon securing the junction box enclosure to the battery pack enclosure.
3. The battery pack assembly of claim 1, wherein the side wall structure of the junction box enclosure has a flanged end that is configured to be removably secured to the battery pack enclosure.
4. The battery pack assembly of claim 1, wherein the at least one switch is a contactor configured to control power from the one or more battery cells.
5. The battery pack assembly of claim 1, wherein the battery pack includes at least one cell management unit mounted within the battery pack enclosure to monitor voltage and temperature of the one or more battery cells of the battery pack.
6. The battery pack assembly of claim 1, wherein the battery pack includes at least two cell management units and wherein the at least two cell management units are daisy chained together.
7. The battery pack assembly of claim 6,
wherein the battery pack assembly comprises a wired connection between the battery management unit and a cell management unit of the at least two cell management units; and
wherein the battery management unit is configured to receive voltage and temperature measurements of the one or more battery cells through the wired connection.
8. The battery pack assembly of claim 1, wherein the junction box base wall includes at least one access panel configured to provide access to electrically connect the junction box and the battery pack.
9. The battery pack assembly of claim 1,
wherein the battery pack assembly is configured to be mounted inside an aircraft wing that includes at least one access panel configured to electrically connect the junction box to the battery pack.
10. The battery pack assembly of claim 9, wherein the battery pack is towards the bottom of the aircraft wing and the junction box is towards the top of the aircraft wing relative to the battery pack and wherein the access panel is on the top of the aircraft wing.
11. The battery pack assembly of claim 9, wherein the battery pack includes at least one stiffener and a crush core on the side of the battery pack opposite the junction box.

12. An aircraft wing, comprising:
a battery pack, the battery pack comprising:
- a battery pack enclosure; and
  - one or more battery cells within the battery pack enclosure; and
a junction box, the junction box comprising:
- a junction box enclosure including one base wall, a side wall structure connected to the base wall, and one open end; and
- a battery management unit, at least one fuse, and at least one switch, each located within the junction box enclosure and mounted to the base wall;
wherein the side wall structure of the junction box enclosure is configured to be removably secured to the battery pack enclosure at the open end, such that the base wall is not within the battery pack enclosure.

13. The aircraft wing of claim 12, wherein the battery pack enclosure includes a cut-out portion that is covered by the junction box upon securing the junction box enclosure to the battery pack enclosure.

14. The aircraft wing of claim 12, wherein the side wall structure of the junction box enclosure has a flanged end that is configured to be secured to the battery pack enclosure.

15. The aircraft wing of claim 12, wherein the at least one switch is a contactor configured to control power from the one or more battery cells.

16. The aircraft wing of claim 12, wherein the battery pack includes at least one cell management unit mounted within the battery pack enclosure to monitor voltage and temperature of the one or more battery cells of the battery pack.

17. The aircraft wing of claim 12, wherein the battery pack includes at least two cell management units and wherein the at least two cell management units are daisy chained together.

18. The aircraft wing of claim 17,
wherein the aircraft wing comprises a wired connection between the battery management unit and a cell management unit of the at least two cell management units; and
wherein the battery management unit is configured to receive voltage and temperature measurements of the one or more battery cells through the wired connection.

19. The aircraft wing of claim 12, wherein the junction box base wall includes at least one access panel configured to provide access to electrically connect the junction box and the battery pack.

20. The aircraft wing of claim 19, wherein the battery pack is towards the bottom of the aircraft wing and the junction box is towards the top of the aircraft wing relative to the battery pack and wherein the top of the aircraft wing includes at least one access panel configured to provide access to electrically connect the junction box to the battery pack.

21. The aircraft wing of claim 12, wherein the battery pack includes at least one stiffener and a crush core on the side of the battery pack opposite the junction box.

22. The battery pack assembly of claim 1, wherein the side wall structure includes four side walls.

23. The battery pack assembly of claim 1, wherein the junction box comprises a high voltage connector and a low voltage connector.

* * * * *